… ¹

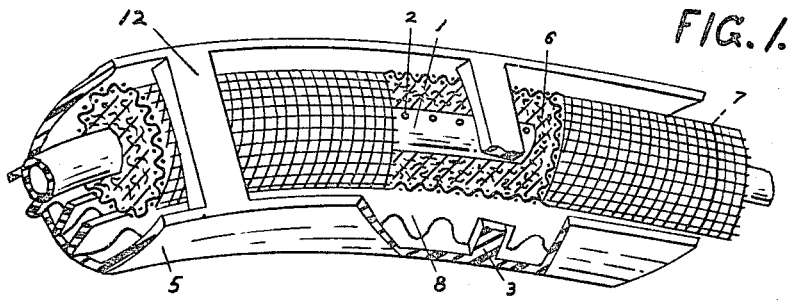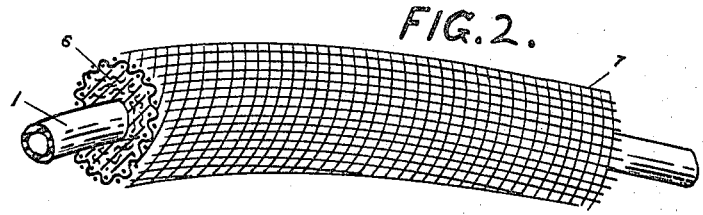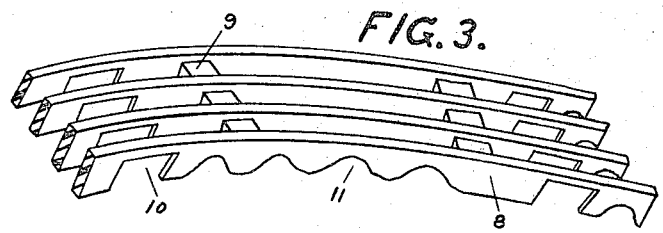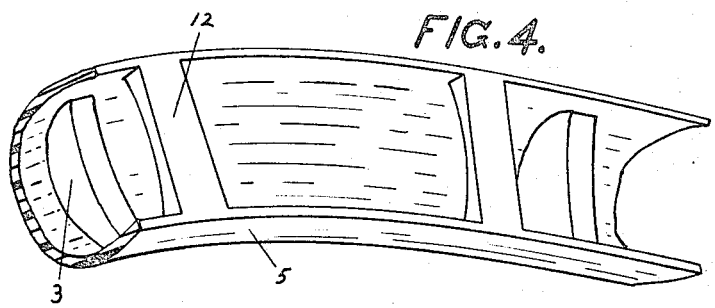

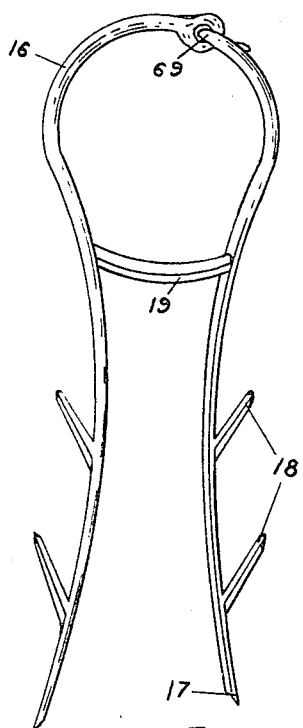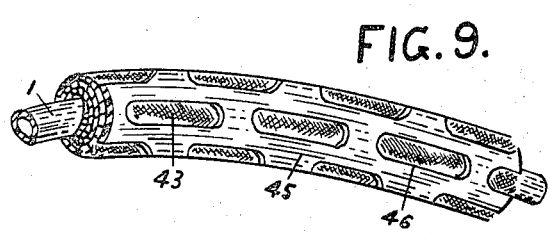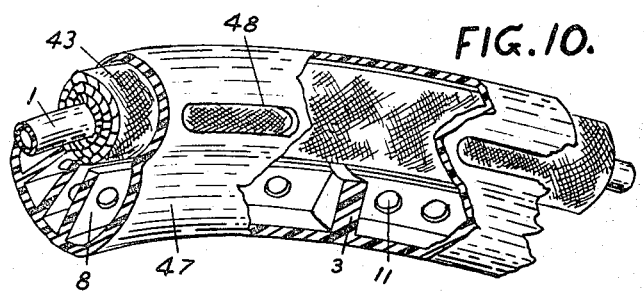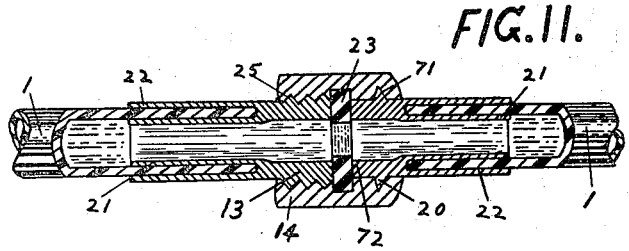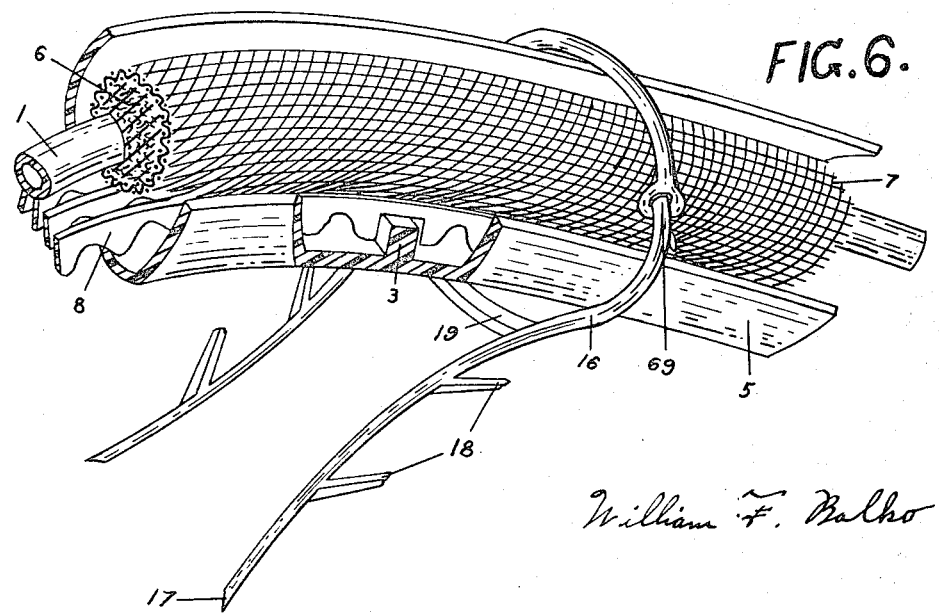

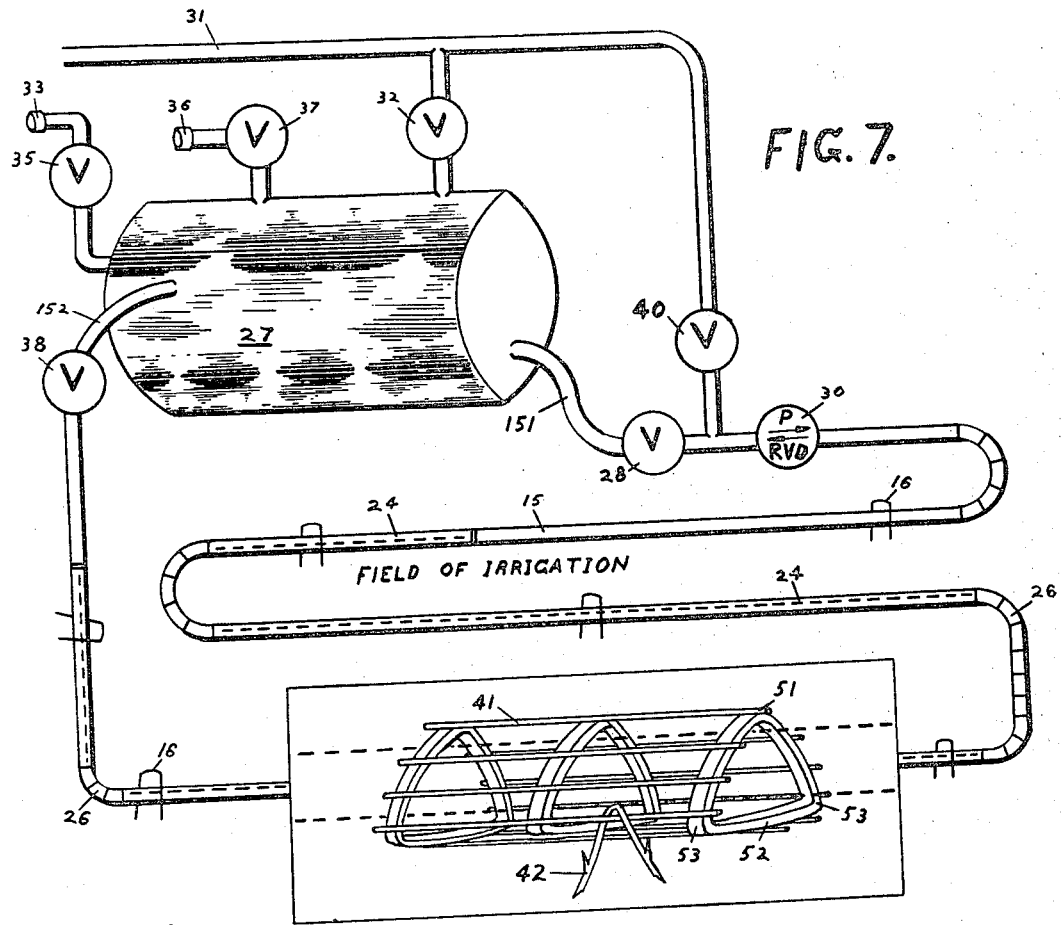
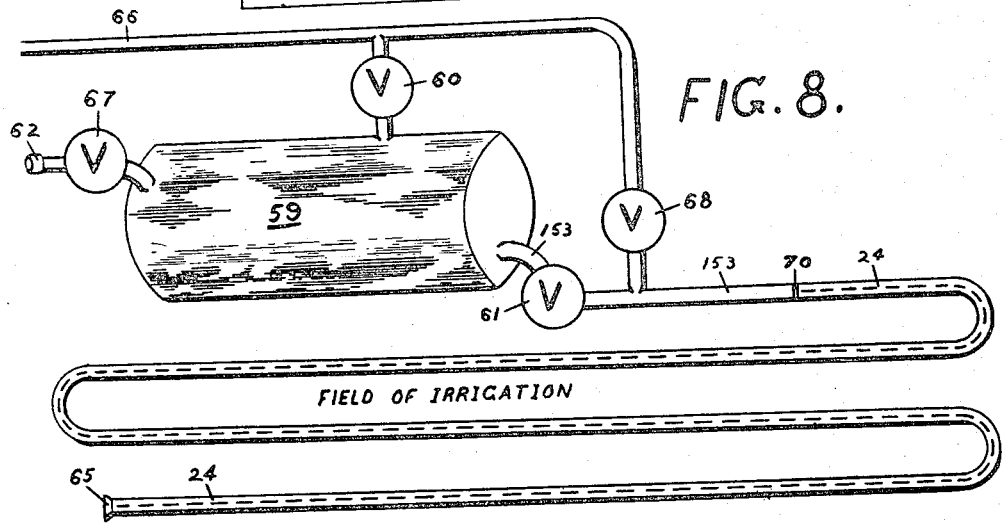

United States Patent Office 3,403,519
Patented Oct. 1, 1968

3,403,519
IRRIGATION CONDUIT ASSEMBLY
William F. Balko, 2909 Plum St.,
Erie, Pa. 16508
Filed Mar. 6, 1964, Ser. No. 350,134
12 Claims. (Cl. 61—13)

ABSTRACT OF THE DISCLOSURE

The invention embodied herein incorporates into sub-irrigation systems the use of concentrical conduit filters the mass of which is variable, casing for retaining moisture close to the surface of and in place in the ground, conduit securing means, couplings, and protective grille, circulatory systems which are reversible for draining, having a storage tank, regulatory valves and pump combined with conduit, and low pressure single-direction systems having a storage tank, regulatory valves and combined conduit.

---

The invention comprises improvements on an implement for irrigating trees and shrubs, lawns and gardens, and large areas for farming. It provides for the use of additives such as seed-destroyers, nutrients, insecticides and other beneficial agents, in the form of watery liquids, which are useful in the cultivation and production of desirable vegetation; and when installed at the proper depth beneath the surface of the ground it provides means for the efficient application of watery liquids which thereby are applied directly to the roots of vegetation, resulting in the least possible loss of such liquids through evaporation and drainage.

The invention can be used to control the level of moisture in areas where such level varies from one extreme to the other by using it in reverse for drawing excessive moisture out of a "field of irrigation" when necessary to bring the moisture down to a controlled level, and by using it for irrigating when the moisture level becomes lower than is deemed desirable.

The express objectives regarding the invention are to provide means: for the conservation of water and the economical use of additives for cultivating desirable vegetation; for pinpointing the application of watery liquids; for irrigating areas which are in constant or nearly continuous pedestrian or vehicular use; for irrigating vegetation situated on terraces and other sloping surfaces; and for irrigating areas used for display or show purposes.

Referring to the drawings:

FIGURE 1 is a perspective view of an irrigation conduit assmebly showing the moisture-retainer casing cut away to expose a section of a transverse, watertight partition and a combined supporting member of the assembly; the filtering sleeve and reinforcing screen sleeve thereof being cut away to show the perforations in the tubular conveyance thereof.

FIGURE 2 is a perspective view of a perforated tube and related filtering sleeve member with a reinforcement member thereon.

FIGURE 3 is a perspective view of an insert-supporting member.

FIGURE 4 is a perspective view of a moisture-retainer casing.

FIGURE 5 is a perspective view of the conduit securing means.

FIGURE 6 is a perspective view of a conduit assembly, including said securing means thereof; the casing of the assembly being cut away to show a section of a transverse, watertight partition and a combined supporting member.

FIGURE 7 is a schematic diagram of a circulatory irrigation system inclusive of a tank, regulative valves, pump, conduit, and shielding means; the inset therein showing a perspective view of the shielding means for conduit.

FIGURE 8 is a schematic diagram of a single-direction irrigation system inclusive of a tank, regulative valves and conduit.

FIGURE 9 is a perspective view of a simplified form of conduit assembly having no casing.

FIGURE 10 is a perspective view of a modified form of conduit assembly with the longitudinal receptacle casing-reinforcement member thereof cut away for viewing a sectional transverse, watertight partition and a longitudinal supporting member therein.

FIGURE 11 is a cutaway view of a conduit coupling fixture joint.

A description of the drawings and the workings of irrigation systems using the invention follows, as related to FIGURES 1 through 11.

FIGURE 1 shows a perforated tube 1 for conveying watery liquids throughout a field of irrigation; the perforations 2 to be, in size, designed to allow fractional outflow therethrough while maintaining sufficient water pressure inside said perforated tube 1 to facilitate extension of watery liquids the length thereof. The packing 6 surrounding the perforated portions of said perforated tube 1 is for filtering out particles that are big enough to obstruct said perforations 2, said packing 6 being held in a compressed state against said perforations 2 by screen sleeve 7, a reinforcement means which encompasses said packing 6. The combined perforated tube 1, packing 6, and screen sleeve 7 are encased by casing 5 which is designed to encompass at least the longitudinal bottom half of said screen sleeve 7, said casing 5 being for the purpose of retaining moisture close to the surface of the ground where desirable for the benefit of surface vegetation. The transverse, watertight partitions 3 which comprise integral parts of said casing 5 are disposed at intervals in the bottom of the trough of said casing 5 for impeding the longitudinal flow of liquids thereinside, so that moisture is retained evenly the length of casing 5 in situations where the irrigation conduit assembly is installed longitudinally on a sloping plane. Supporting means 8 which comprises long, flat strips, disposed on edge with their flat surfaces facing, which strips being parallel to one another the width of said casing 5 and extending its length, are for supporting said perforated tube 1, said packing 6, and said screen sleeve 7 to prevent the constricting of said perforated tube 1 by its being pressed against a transverse, watertight partition 3 in the event a heavy object passes or is placed upon the conduit assembly. The attachment means 12, which are disposed at intervals along the top of said casing 5, are for combining the aforesaid component parts of the conduit assembly into a unit, to facilitate compactness therein for the purpose of convenience pertinent to installing said assembly.

Said perforated tube 1 is to be made of a suitable metal or plastic tubular extrusion, punctured by any known means, said packing 6 to be made of corrosion-resistant fine metal wire or of glass or synthetics of similar form, or of a mixture of same; such packing 6 to be sufficiently abundant to facilitate clearance between said perforated tube 1 and earth which might be packed tightly around said packing 6 or said screen sleeve 7 which encompasses said packing 6, said clearance to be calculated to be sufficient to allow watery liquids to be absorbed by surrounding earth in order to keep the ground around said irrigation conduit assembly from swelling. The screen 7 encompassing said packing 6 is to hold said packing 6 in a compressed state sufficient to facilitate filtering means for the perforations 2 of said perforated tube 1, so that if the motion of said watery liquids is reversed, for any reason, said perforations 2 will not be obstructed.

Said screen 7 is to be made of corrosion-resistant metal wire, or of a suitable synthetic; said casing 5 to be made of a synthetic where flexibility therein is desirable, or of corrosion-resistant metal, especially where rigidity therein is necessary, as regards fixed-shape casing 26 which is specified under FIGURE 7 hereof.

FIGURE 2 shows, combined, a perforated tube 1 with said packing 6 encompassing the entire periphery of said perforated tube 1, said screen sleeve 7 enveloping said packing 6 thereon.

FIGURE 3 shows said flat strips 8, with the combining means 9 therefor which reinforce said flat strips 8 for supporting means as aforesaid, the square holes 10 therein allowing sufficient clearance for said transverse, watertight partitions 3 when supporting member strips 8 comprise a removable insert-member of a conduit assembly for being inserted into said casing 5 thereof, the round holes 11 sufficing to allow watery liquids in a casing 5 to seek and/or maintain a common level between said transverse, watertight partitions 3 therein.

FIGURE 4 shows said casing 5 with integrally molded transverse, watertight partitions 3 and integrally molded attachment means 12.

FIGURES 2, 3, and 4 show basic component parts of said irrigation conduit assembly individually to elucidate the structure of said assembly.

FIGURE 5 shows a securing means 16 which is designed to hold an irrigation conduit assembly securely in the ground so that under the action of high pressure used in the irrigation system such conduit assembly will not become uprooted from the ground; said securing means 16 comprising a metal hoop which encompasses the periphery of said irrigation conduit assembly and which has two long pointed prongs 17 which are to be forced into the ground, said prongs 17 having barbs 18 thereon for securing said prongs 17 into the ground, the cross-member 19 being for fastening said securing means 16 to the remainder of an irrigation conduit assembly, the fastener 69 on the top of said securing means 16 being for the purpose of allowing the remainder of the irrigation conduit assembly conveniently to be separated from such securing means 16; said securing means 16 to be made of a metal which has the property of resisting corrosion when exposed to moisture and the ground.

FIGURE 6 shows an irrigation conduit assembly which utilizes said securing means 16 to hold the component parts of said conduit assembly together, said securing means 16 therein taking the place of attachment means 12 in order to allow, more readily, the disassembling of the component parts of said assembly.

FIGURE 7 shows a storage tank 27 which can be filled with water by opening valve 32, allowing water from water-source pipe 31 to flow into said tank 27. Inlet coupling 33 is for use when liquids are piped from another source into said tank 27, valve 35 being used to control the flow of air when coupling 33 is disengaged or to control the flow of water through coupling 33 into said tank 27. Coupling 36 is for coupling an additive-source to said storage tank 27, valve 37 being for controlling the flow of watery additives from their source into said tank 27, or, when coupling 36 is disengaged, for allowing the flow of air into said tank 27. By opening valve 40 water can be allowed to flow through the system at its regular pressure, or by operating the pump 30 the water can be forced through the irrigation system with greater force. Valves 32, 35, and 37 can be closed if valve 38 is open to allow watery liquids in said storage tank 27 to circulate through the entire system to the extent that the residuum of said watery liquids will be returned into said tank 27, the remainder of said watery liquids having been dispensed into said field of irrigation. The amount of water dispensed into the field of irrigation can be incased by partly closing valve 38 so that the watery liquids used in the system are forced to flow, with pressure, outwardly through the perforations of said irrigation conduit assembly 24. Pump 30, when reversed, can pump excess water from the field of irrigation back through said tank 27 and out through coupling 33 or 36 thereby being used as outlets through which excess water can be carried away from said field of irrigation. Fixed-shape casing 26 is shown at the curves in the irrigation conduit assembly 24 in FIGURE 7, said fixed-shape casing 26, made of a metal or synthetic which is not flexible, being designed expressly for the purpose of maintaining rigidity in angles and curves in an irrigation conduit assembly wherein used, so that when liquids are pumped through said conduit assembly 24 at high pressures said conduit assembly 24 will maintain the shape that it is meant to have; said fixed-shape casing 26 being to some extent a protection for a conduit assembly 24, also. Securing means 16 are shown along the entire irrigation conduit assembly 24. Shielding means 41, shown in the inset in FIGURE 7, comprises shielding means for said irrigation conduit assembly 24, to protect it from vehicles and other heavy objects; such shielding means 41 to encompass said irrigation conduit assembly 24 upon any length thereof which is exposed to such heavy objects. Said shielding means 41 has an arched top 51 which protects the top of said conduit assembly 24, the two sides of said shielding means 41 joining the bottom 52 thereof at angles 53, thereby forming a long semicircular grating member. Securing means 42, shaped like an inverted V and designed to fasten said shielding means 41 into the ground, has barbed prongs in order to maintain a substantial hold in the ground. Shielding means 41 is to be made of galvanized sheet, brass, or aluminum, welded at the joints.

The pump 30 is to be powerful enough to draw watery liquids from said storage tank 27 and forcibly project said watery liquids throughout the length of said perforated tube 1 in said irrigation conduit assembly 24, taking into consideration the length of said irrigation conduit assembly 24, the amount of outflow of watey liquids such assembly is designed to allow to flow through said perforations 2 thereof, and the capacity in volume of the entire irrigation system. The outlet tube 151 is to be greater in size and/or capacity than the perforated tube 1 in said irrigation conduit assembly 24 or the inlet tube 152 because of the outflow of watery liquids from said perforations 2 along said irrigation conduit 24 and the resultant necessity of a sufficient amount of watery liquids at the inlet of said pump 30.

The regular unperforated tubing 15 used in combination with perforated tubing 1 of said irrigation conduit assembly 24, as shown in FIGURE 7, illustrates how irrigation can be pinpointed, thereby leaving certain areas within a field of irrigation unirrigated.

FIGURE 8 shows a storage tank 59 for storing watery liquids, a valve 60 for opening, regulating, or shutting off inflow of water from water-source pipe 66 into said tank 59, another inlet to said tank 59 with a coupling 62 on the end thereof, and a valve 67 in said inlet for the purpose of opening, regulating, or shutting off said inlet, such inlet being for the purpose of conveying additives such as nutrients, weed-destroyers and other beneficial agents into said tank 59 so that said additives can be conveyed throughout the field of irrigation. Outlet 153 is for conveying watery liquids from tank 59 to the field of irrigation. Valve 61, which can be opened, regulated, or closed, is for regulating the outflow of watery liquids from said tank 59. Valve 68, which can be opened, regulated, or closed, controls the flow of water from water-source pipe 66 into outlet 153 so that water from said water-source pipe 66 and additives flowing from said tank 59 through said valve 61 can be controlled, as regards the mixture thereof, by co-ordinating the use of said valves 60, 61, and 68. Coupling 70 couples said outlet pipe 153 to the perforated tube 1 in said irrigation conduit assembly 24 which is disposed throughout said field of irrigation, usually underneath the surface of the ground, to irrigate strata surrounding said irrigation conduit assembly 24, said conduit assembly 24 having a plug 65 in the end thereof.

FIGURE 9 shows a simple form of irrigation conduit assembly designed for use in thick turf, which absorbs moisture fast and retains it, where no casing 5 is necessary. It is comprised of a perforated tube 1, a woven, water-permeable sleeve 43, and an outer sleeve 45 having large holes 46 therein. Said woven, water-permeable sleeve 43 is comprised of one or more than one thickness of woven, water-permeable material, according to the amount of clearance required in such sleeve 43 thereof, which clearance is relative to the amount of outflow that the remainder of said irrigation conduit assembly of which said sleeve 43 is a part is designed to allow, taking into consideration particularly the size of the perforations in the tube 1 thereof and the amount of pressure with which such irrigation system is to operate. Said outer sleeve 45 is designed to reinforce the compactness of said woven, water-permeable sleeve 43 and to add to the general uniformity and/or durability of the conduit, said holes 46 being to allow liquids to flow freely from said perforated tube 1 and water-permeable sleeve 43 thereof into surrounding strata. Securing means as described herein, being smaller than the securing means shown in FIGURE 6, can be used therewith where necessary.

Said outer sleeve 45 is to be made of either a suitable synthetic or of metal foil, and, when made of a synthetic, can be sprayed onto said woven, water-permeable sleeve 43 in such pattern desired of said outer sleeve 45, including said holes 46 therein, modern masking methods being used to form such pattern.

FIGURE 10 shows a section of irrigation conduit assembly of modified construction having an integrally combined longitudinal receptacle-reinforcement member in the form of the sleeve-casing 47 which combines the principles of the aforesaid outer sleeve 45 and casing 5. Said sleeve-casing 47 encompasses the woven, water-permeable sleeve 43 with the longitudinal top portion of said sleeve-casing 47 fitting the contour of said woven, water-permeable sleeve 43, the bottom portion of said sleeve-casing 47 widening for the purpose of forming the part thereof which comprises the casing. The periphery of said sleeve-casing 47 is closed throughout its length except for a line of large holes 48 along both sides thereof for allowing watery liquids to flow from the perforated tube 1 thereof outwardly and into the surrounding strata for irrigating. The bottom longitudinal portion of said sleeve-casing 47 which forms the trough of the casing thereof has therein transverse, watertight partitions 3 and longitudinal supporting means 8, molded as integral parts of said sleeve-casing 47, said supporting means 8 therein having holes 11 therealong for allowing watery liquids in the trough of said sleeve-casing 47 to seek and/or maintain a common level between said transverse, watertight partitions 3 therein. Securing means 16 such as illustrated in FIGURE 5 can be used with said modified irrigation conduit assembly shown in FIGURE 10 the same as with other forms of the irrigation conduit assembly.

FIGURE 11 shows coupling means comprising an interiorly-threaded coupling fixture 14 which is threaded to turn onto the exteriorly-threaded coupling fixture 13. Said interiorly-threaded coupling fixture 14 has a groove 71 therein which is circularly disposed upon the inner wall of the end of the sleeve thereof opposite the interiorly threaded portion 25 of said fixture 14, said interior circular groove 71 being formed to fit upon the flange 20 so that said interiorly-threaded coupling fixture 14 is allowed to rotate freely upon said flange 20 but cannot be disconnected therefrom; said interiorly-threaded coupling fixture 14, when turned upon said exteriorly-threaded coupling fixture 13, forcing said fixture 13 to seat upon one side of washer 23, said washer 23 seating the end of the other tube 72 which has flange 20 thereon on the opposite side of said washer 23, thereby forming a disconnectable watertight joint. Both said exteriorly-threaded coupling fixture 13 and said interiorly-threaded coupling fixture 14 are watertightly affixed to a perforated tube 1 of a conduit assembly by the interior metal tube 21 being inserted into the end of such perforated tube 1, an integral part of said metal tube 21 traversing the end of the wall of said perforated tube 1 along its periphery thence extending back upon the periphery of the exterior of the wall of said tube 1 thereby comprising an exterior metal tube 22; said interior and exterior metal tubes, 21 and 22, respectively, being forced together upon the circumference of the wall of said perforated tube 1 compressively holding it therebetween. The coupling fixtures are to be made of a metal which resists corrosion when exposed to moisture and the ground.

The inventor believes that the foregoing description of irrigation systems using the invention, when studied in connection with FIGURES 1 through 11 hereof, makes possible the use of the invention by anyone skilled in mechanical/technical arts which are related to the invention.

I claim:

1. In an irrigation conduit assembly having therein as components a tubular conveyance having perforated portions therealong, a water-permeable sleeve member covering the perforated portions of said tubular conveyance, and a reinforcement member with holes therein, which member encompasses said water-permeable sleeve member: such additional components in combination with those aforesaid comprising a longitudinal receptacle defining a trough that encases all except the top plan portion of said water-permeable sleeve member and said reinforcement member, said receptacle having integral attachment members transversely disposed at intervals in the otherwise open top portion of the trough and having integral transverse, watertight partitions disposed at intervals in the bottom of the trough thereof, such partitions extending transversely from one to the opposite sidewall of said receptacle and vertically from the bottom of the trough approximately half-way to the top thereof, said receptacle having longitudinal supporting means for supporting said perforated portions of said tubular conveyance, said water-permeable sleeve member and said reinforcement member, said supporting means extending longitudinally the length of said trough and vertically from the bottom thereof to the vicinity of the level of the tops of said watertight partitions therein, said supporting means having holes therein for water to traverse therethrough and being reinforced against lateral stress by transverse combining members for individuals supporting member components thereof, said combining members being disposed at intervals the length of said supporting means, and securing means which comprise individual metal members each of which encompasses the periphery of said longitudinal receptacle and has two long oppositely disposed projecting members, one on each side thereof, both such projecting members directed substantially vertically downward and having integral barb components thereon for gripping into the ground, said securing means having an openable and closeable fastener as a component of the member thereof which encompasses said longitudinal receptacle.

2. In combination with the invention defined in claim 1, shielding means comprising a rigid semicircular sleeve structure having holes therein and having a flat bottom and an arched top, such structure encompassing said longitudinal receptacle, and securing means constructed in the form of an inverted V which attaches to said structure and has both ends thereof extended in length and equipped with integral barbs for gripping into the ground.

3. In combination with the invention defined in claim 1, and connected in sequence in the following order: a storage tank; an outet of said tank, which outlet having therein a valve; a reversible, variable delivery pump; said tubular conveyance having perforated portions therealong; and an inlet of said tank, which inlet having therein a valve.

4. The invention defined in claim 1 whereof said longitudinal receptacle is composed of a rigid material.

5. The invention defined in claim 1 whereof said longitudinal supporting means comprises a member which is separable from said longitudinal receptacle.

6. The invention defined in claim 1 wherefrom said integral attachment members are excluded and the metal member of said securing means which encompasses the periphery of said longitudinal receptacle operates to take the place of such excluded attachment members.

7. In an irrigation conduit assembly having as components a tubular conveyance with perforations therein, a water-permeable sleeve member covering the perforations of said tubular conveyance, and a reinforcement member which encompasses said water-permeable sleeve member: such a water-permeable sleeve member having massiveness which permits flow of watery liquids therethrough commensurate with such flow that such tubular conveyance combined therewith permits from its perforations; such a reinforcement member constituting metal foil which has holes therein; and combined with the aforesaid, securing means comprising a metal member which encompasses the periphery of said reinforcement member and has two long oppositely disposed projecting members, one on each side thereof, said projecting members being directed substantially vertically downward and having integral barb components thereon for gripping into the ground, said securing means having an openable and closeable fastener as a component of the member thereof which encompasses said reinforcement member.

8. The invention defined in claim 7 whereof said reinforcement member comprises a sleeve of resinous material having holes therein.

9. The invention defined in claim 7 whereof said massiveness of said water-permeable sleeve member comprises a variable number of sheets of water-permeable material combined face to face and disposed concentrically upon the perforated portions of said tubular conveyance.

10. In an irrigation conduit assembly having as components a tubular conveyance with perforated portions therein, and a water-permeable sleeve member covering said perforated portions of said tubular conveyance: such additional components combined with those aforesaid comprising an integrally combined longitudinal receptacle-reinforcement member whereof the top portion encompasses the top periphery of said water-permeable sleeve member and is formed to fit the contour thereof approximately for one-half of the circumference of said water-permeable sleeve member, said longitudinal receptacle-reinforcement member widening at said one-half circumference point then extending downward somewhat and being brought together thereby forming a longitudinal receptacle defining a trough directly under and aligned with said water-permeable sleeve member, said trough having integral transverse, watertight partitions disposed at intervals in the bottom thereof, which partitions extend horizontally from one to the opposite side-wall of said receptacle and vertically from the bottom of the trough thereof approximately to one-half the distance to the jointure of said receptacle with said integrally combined reinforcement member, said receptacle having longitudinal supporting means whereof component members extend from the bottom of the trough of said receptacle upward to abut upon said water-permeable sleeve member, said supporting means having holes therein or water to traverse there-through and being reinforced against lateral stress by transverse combining members for individual supporting member components thereof, said longitudinal receptacle-reinforcement member having holes in both side-walls thereof, which holes are disposed at intervals in a straight line along the jointure of said longitudinal receptacle with said reinforcement member, and securing means which comprise individual metal members each of which encompasses the periphery of said longitudinal receptacle-reinforcement member and has two oppositely disposed long integral projecting members, one on each side thereof, which long members being directed substantially vertically downward and having integral barb components thereon for gripping into the ground, said securing means having an openable and closeable fastener as a component of the member thereof which encompasses the periphery of said longitudinal receptacle-reinforcement member.

11. In combination with the invention defined in claim 10, including coupling means which comprise coupling fixtures axially affixed to ends of said perforated tubular conveyance by peripheral clamping means which are parts of said coupling fixtures, which coupling fixtures include one of two combinational such coupling fixtures being exteriorly threaded to fit into an interiorly-threaded end portion of a sleeve component of the other combinational coupling fixture, the end of said interiorly-threaded sleeve opposite the threaded end portion thereof having an interior circular groove encompassing the inner wall thereof, said interior circular groove fitting upon and being rotatable on a circular flange which is on an extended portion of a metal tubular member whereof the opposite end comprises a peripheral clamping means affixed to the end of the tube which is to be joined to such tube having thereon said exteriorly-threaded coupling fixtures, said interiorly-threaded sleeve having a circular washer axially disposed thereinside in such portion of said sleeve between said interior threading and said interior circular groove, whereby said washer seating said extended portion to said metal tubular member on its one side, the opposite side of said washer seating the exteriorly-threaded end of said exteriorly-threaded coupling fixture to facilitate said coupling means; the claimed part of such coupling means comprising: said interiorly-threaded sleeve component.

12. In combination with the invention defined in claim 10, a storage tank; an outlet of said tank, which outlet having therein a valve, then extending somewhat and being coupled to said tubular conveyance with perforated portions therein; an inlet of said tank, which inlet having therein a valve and being connected to a water-source; and a pipe with a valve therein, which pipe being connected at one end with said water-source, the opposite end of said pipe joining into said outlet of said tank between the valve in said outlet and the coupling thereof which is connected to said tubular conveyance.

References Cited

UNITED STATES PATENTS

| | | | |
|---|---|---|---|
| 299,347 | 5/1884 | Chisholm | 61—13 |
| 535,809 | 3/1895 | Blanchard | 61—10 |
| 656,537 | 8/1900 | Fox | 61—13 |
| 888,217 | 5/1908 | Bishop | 61—13 |
| 927,606 | 7/1909 | Sellenscheidt. | |
| 965,895 | 8/1910 | Hardin | 61—13 |
| 1,130,282 | 3/1915 | Heacock | 61—13 |
| 1,281,427 | 10/1918 | Steelquist | 61—12 |
| 1,394,780 | 10/1921 | Nicholas | 61—13 X |
| 1,895,324 | 1/1933 | Heacock | 61—10 |
| 2,052,020 | 8/1936 | Black | 61—13 |
| 2,536,196 | 1/1951 | MacLeod | 61—13 |
| 2,763,991 | 9/1956 | Kennon | 61—13 |
| 2,798,768 | 7/1957 | Babin | 61—13 X |
| 2,807,505 | 9/1957 | Weitzel | 61—12 X |
| 3,103,789 | 9/1963 | McDuff et al. | 61—11 |
| 3,220,194 | 11/1965 | Lienard | 61—13 |

EARL J. WITMER, *Primary Examiner.*